US010239779B2

(12) United States Patent
Gabel et al.

(10) Patent No.: US 10,239,779 B2
(45) Date of Patent: Mar. 26, 2019

(54) GLASS CERAMIC AND METHOD FOR PRODUCING SAME

(71) Applicant: SCHOTT AG, Mainz (DE)

(72) Inventors: Falk Gabel, Schlangenbad (DE); Friedrich Siebers, Nierstein (DE); Evelin Weiss, Mainz (DE)

(73) Assignee: SCHOTT AG, Mainx (DE)

( * ) Notice: Subject to any disclaimer, the term of this patent is extended or adjusted under 35 U.S.C. 154(b) by 0 days.

(21) Appl. No.: 14/583,953

(22) Filed: Dec. 29, 2014

(65) Prior Publication Data

US 2015/0109760 A1 Apr. 23, 2015

Related U.S. Application Data

(63) Continuation of application No. PCT/EP2013/063223, filed on Jun. 25, 2013.

(30) Foreign Application Priority Data

Jun. 26, 2012 (DE) .................. 10 2012 105 576

(51) Int. Cl.
*C03C 10/14* (2006.01)
*C03B 32/02* (2006.01)
(Continued)

(52) U.S. Cl.
CPC .............. *C03C 10/00* (2013.01); *C03B 32/02* (2013.01); *C03C 3/087* (2013.01); *C03C 3/097* (2013.01);
(Continued)

(58) Field of Classification Search
CPC .. C03C 10/00; C03C 10/0009; C03C 10/0027
See application file for complete search history.

(56) References Cited

U.S. PATENT DOCUMENTS 5,492,869 A * 2/1996 Beall .................. C03C 10/0027
501/68
7,473,660 B2 * 1/2009 Comte ............... C03C 10/0027
501/4
(Continued)

FOREIGN PATENT DOCUMENTS

CN 1696072 11/2005
DE 19939787 C2 11/2003
(Continued)

OTHER PUBLICATIONS

German Office Action dated Mar. 11, 2013 for corresponding German Patent Application No. 102012105576.9 with English translation, 8 pages.
(Continued)

*Primary Examiner* — Karl E Group
(74) *Attorney, Agent, or Firm* — Ohlandt, Greeley, Ruggiero & Perle, L.L.P.

(57) ABSTRACT

A glass ceramic article is provided so that a reliable coloring with a defined transmittance is ensured. The reliable coloring of the glass ceramic article is based on a high content of iron oxide of more than 0.1 percent by weight which itself has a strongly coloring effect does not further reduce transmittance but rather interacts with vanadium oxide to attenuate the absorption caused by vanadium oxide.

15 Claims, 4 Drawing Sheets

(51) Int. Cl.
  *C03C 10/00* (2006.01)
  *C03C 3/087* (2006.01)
  *C03C 3/097* (2006.01)
  *C03C 4/02* (2006.01)
  *F21V 33/00* (2006.01)
  *F21Y 115/10* (2016.01)

(52) U.S. Cl.
  CPC ............ *C03C 4/02* (2013.01); *C03C 10/0027* (2013.01); *F21V 33/0044* (2013.01); *C03C 2204/00* (2013.01); *C03C 2218/36* (2013.01); *F21Y 2115/10* (2016.08)

(56) References Cited

U.S. PATENT DOCUMENTS

| | | | |
|---|---|---|---|
| 8,722,554 B2 * | 5/2014 | Comte | C03B 5/193 501/4 |
| 9,018,113 B2 * | 4/2015 | Siebers | C03B 32/02 219/445.1 |
| 2005/0252503 A1 | 11/2005 | Siebers | |
| 2005/0255983 A1 | 11/2005 | Becker et al. | |
| 2007/0129231 A1 | 6/2007 | Comte | |
| 2010/0224619 A1 | 9/2010 | Schoenberger | |
| 2011/0009254 A1 | 1/2011 | Schweiger | |
| 2011/0256409 A1 | 10/2011 | Ritzberger | |
| 2012/0035041 A1 * | 2/2012 | Comte | C03B 5/193 501/32 |
| 2012/0067865 A1 * | 3/2012 | Siebers | C03C 10/0045 219/445.1 |
| 2013/0201678 A1 * | 8/2013 | Siebers | C03B 32/02 362/231 |
| 2015/0197444 A1 * | 7/2015 | Comte | C03C 3/087 428/220 |
| 2016/0168018 A1 * | 6/2016 | Gabel | C03C 3/085 501/32 |
| 2016/0176752 A1 * | 6/2016 | Gabel | C03B 32/02 501/4 |

FOREIGN PATENT DOCUMENTS

| | | | |
|---|---|---|---|
| DE | 102008050263 | A | 4/2010 |
| DE | 102009013127 | A1 | 9/2010 |
| DE | 202010014361 | | 12/2010 |
| DE | 102009032113 | | 1/2011 |
| DE | 102010032112 | A1 | 1/2012 |
| DE | 102010032113 | A1 | 1/2012 |
| EP | 0156479 | | 10/1985 |
| EP | 1465460 | | 10/2004 |
| EP | 2226303 | | 9/2010 |
| EP | 2377831 | | 10/2011 |
| FR | 2992311 | * | 12/2013 |
| JP | 11100229 | | 4/1999 |
| JP | 11100230 | | 4/1999 |
| JP | 2004251615 | A | 9/2004 |
| JP | 2006330288 | A | 12/2006 |
| JP | 2009527436 | | 7/2009 |
| WO | 2010040443 | * | 4/2001 |
| WO | 2010040443 | A2 | 4/2010 |
| WO | 2010137000 | | 12/2010 |
| WO | 2011089220 | | 7/2011 |
| WO | 2012010278 | * | 1/2012 |

OTHER PUBLICATIONS

International Search Report dated Oct. 1, 2013 for corresponding PCT Patent Application No. PCT/EP2013/063223 with English translation, 6 pages.
English Translation of International Preliminary Report on Patentability for corresponding PCT Patent Application No. PCT/EP2013/063223 dated Mar. 22, 2016.
Written Opinion for corresponding PCT Patent Application No. PCT/EP2013/063223 dated Dec. 26, 2014.
Ultrafine grained glass-ceramics obtained with Cr2O3 additions, B. Andrianasolo et al., J. Non-Cryst. Solids 126 (1990) 103-110.
Soules et al, "Finite-Element Calculation of Stresses in Glass Parts Undergoing Viscous Relaxation", J. Am. Ceramic Soc., vol. 70, No. 2, 1987, pp. 90-95.
Jedamzik et al, "Modeling of the thermanl expansion behavior of ZERODUR® at arbitrary temperature profiles", Proc. of SPIE, vol. 7739, 773901-4, 12 pages.

* cited by examiner

GLASS CERAMIC AND METHOD FOR PRODUCING SAME

CROSS REFERENCE TO RELATED APPLICATIONS

This application is a continuation of International Application Serial No. PCT/EP2013/063223 filed Jun. 25, 2013, which claims benefit under 35 U.S.C. § 119(a) of German Patent Application No. 10 2012 105 576.9 filed Jun. 26, 2012, the entire contents of both of which are incorporated herein by reference.

BACKGROUND

1. Field of the Invention

The invention generally relates to the technical field of glass ceramics. More particularly, the invention relates to transparent glass ceramics which include color-imparting polyvalent ions.

2. Description of Related Art

Glass ceramic plates find application as cooktops, inter alia. The glass ceramics used for this purpose typically exhibit low to zero thermal expansion of usually less than $1.5 \times 10^{-6}$/K in a temperature range between room temperature and the operating temperature of up to 700° C. In one embodiment, these glass ceramics are transparently dyed throughout their volume in order to hide the components of the hearth arranged below the cooktop. In a second embodiment, the glass ceramics are transparent and the technical components below the glass ceramic can be hidden from view by opaque, i.e. light-blocking coatings on the lower and/or upper surfaces. This transparent embodiment of the glass ceramic is also used for fireplace window applications. And, for practical or aesthetic reasons it has been desired to enable luminous display elements to shine through the glass ceramic plate. In this case, high transmission and low color distortion are desirable. In the transparent embodiment, a good and unaltered view on a colored lower surface coating, for example, or on the flames in the fireplace should be ensured.

WO 2010/040443 A2 discloses a transparent, dyed cooktop with improved color display capability, which comprises a glass ceramic that includes high quartz mixed crystals as a predominant crystal phase, and the glass ceramic is free of chemical refining agents arsenic oxide and/or antimony oxide, except for inevitable traces. The glass ceramic exhibits transmittance values of greater than 0.1% in the region of visible light in the entire range of wavelengths greater than 450 nm, with a light transmittance in the visible region ranging from 0.8 to 2.5% and in the infrared region at 1600 nm ranging from 45 to 85%.

In order to achieve the coloration, vanadium oxide, $V_2O_5$, and iron oxide are added as color-imparting oxides.

Vanadium oxide has a very strong coloring effect. Therefore it is added in appropriately low amounts. This implies that adjustment of an intended transmittance is critical, since small deviations of the vanadium content in the glass mixture cause strong alterations in the color appearance of the glass ceramic. This problem is exacerbated further when comparatively high transmittance values are to be achieved in the visible spectral range, since this even increases the relative variations of the vanadium oxide content with a given uncertainty in the dosing of the mixture.

It would therefore be desirable to provide a glass ceramic which is produced in a manner so that a reliable coloring with a defined transmittance is ensured.

SUMMARY

The invention is based on the surprising finding that a high content of the intrinsically strongly color-imparting iron oxide of more than 1000 ppmw, i.e. more than 0.1 percent by weight, does not further decrease transmittance but rather interacts with the vanadium oxide to attenuate the absorption caused by the vanadium oxide.

Accordingly, the absorption coefficient of the glass ceramic according to the invention is less than the absorption coefficient as caused by the added proportion of vanadium oxide, at least in a partial interval of the visible spectral range.

In particular, the invention provides a lithium aluminosilicate glass ceramic article, in particular in form of a glass ceramic plate, which includes vanadium oxide as a color-imparting component in a proportion of at least 0.005, preferably at least 0.01 percent by weight, more preferably up to 0.05 percent by weight, wherein a content of tin oxide is less than 0.5 percent by weight, and wherein the glass ceramic article includes as a further component iron oxide in a proportion of more than 0.1 percent by weight and/or cerium oxide in a proportion of at least 0.1 percent by weight, wherein the iron oxide content or the cerium oxide content is at least the same or greater than the vanadium oxide content; and wherein light transmittance of the glass ceramic article in the visible spectral range when illuminated perpendicularly to the surface of the glass ceramic article is greater than 2.5%. Preferably, transmittance is even adjusted to at least 5%. In particular, the iron oxide content is preferably adjusted to more than 0.12 percent by weight.

The invention does not only relate to flat glass ceramic plates. Rather, an inventive glass ceramic article may be curved or may have a three-dimensional shape, e.g. in the form of a plate with curved edges or in the form of a vessel, such as a wok, or a hollow molded in a portion of the plate, which then forms a wok.

As mentioned before, the high transmittance is surprisingly caused by the fact that the iron oxide or cerium oxide reduces the color-imparting or light-absorbing property of the vanadium oxide.

In the context of the invention, transmittance refers to the transmittance as measured according to DIN 5033 which is identical to the Y value according to the CIE color system as measured with standard illuminant C. This light corresponds to white light of a color temperature of 6800 K and thus represents average daylight. In other words, the glass ceramic has a Y value according to the CIE color system as measured with standard illuminant C in transmission of at least Y=2.5%, preferably at least Y=5%.

A corresponding effect is obtained not only when adding iron oxide, but also with cerium oxide. Accordingly, alternatively or additionally, an addition of at least 0.1 percent by weight of cerium oxide may be contemplated.

Preferably, a lithium aluminosilicate glass ceramic is used for the invention, which is particularly suitable for cooktops because of its low to zero thermal expansion in a wide temperature range.

Preferably, such a glass ceramic comprises the following essential components, in percent by weight, on an oxide basis:

| | |
|---|---|
| Li$_2$O | 3-5; |
| Al$_2$O$_3$ | 18-25; |
| SiO$_2$ | 55-75; and |
| TiO$_2$ | 1-5. |

According to the description in DE 19939787 C2 and WO 2010/040443 A2, the coloring is caused by V$_2$O$_5$ in a redox process. In the crystallizable starting glass, the coloring caused by V$_2$O$_5$ is still rather weak and leads to a slightly greenish hue. During ceramization the redox process is proceeding, vanadium is reduced and the redox partner is oxidized. The refining agent is assumed to function as the primary redox partner, which has been shown by Mossbauer studies on Sb- and Sn-refined compositions. During ceramization, part of the Sb or Sn or As in the starting glass is transformed into a higher oxidation state Sb$^{5+}$ or Sn$^{4+}$ or As$^{5+}$, respectively. It has been assumed that the vanadium is incorporated into the glass ceramic crystal in a reduced oxidation state, as V$^{4+}$ or V$^{3+}$, and has an intense color-imparting effect there due to electron charge transfer reactions. As a further redox partner, TiO$_2$ may also enhance the coloring effect caused by vanadium oxide. Based on this mechanism it can be assumed that sufficiently large quantities of iron oxide or cerium oxide partially inhibit the incorporation of the vanadium oxide into the glass ceramic crystal and/or counteract a reduction of the vanadium oxide. The glass ceramic crystal considered is the main phase usually composed of high quartz mixed crystals or the seed crystals of TiO$_2$, ZrO$_2$, and, if present, SnO$_2$.

For the decoloration mechanism on which the invention is based it has accordingly been found favorable to avoid too high levels of tin oxide and titanium oxide, or to set them in a relation to the contents of Fe$_2$O$_3$ and/or CeO$_2$. Accordingly, it is contemplated that the glass ceramic has a content of tin oxide of less than 0.5 percent by weight, preferably a content of tin oxide in a range from 0.15 to 0.5 percent by weight, more preferably in a range from 0.2 to 0.45 percent by weight. Such tin oxide contents yet prove to be sufficient for refining the starting glass of the glass ceramic even without significant amounts of arsenic oxide, As$_2$O$_3$, or antimony oxide, Sb$_2$O$_3$. The total content of As$_2$O$_3$ and Sb$_2$O$_3$ together is preferably less than 0.1 percent by weight, more preferably the glass ceramic is technologically free of these refining agents. That means they are not detectable by conventional methods for determining weight proportions. The refining by employing tin oxide may be promoted by chloride and/or sulfate compounds as well as by high-temperature refining above 1750° C. Additions of fluorine or bromine compounds for refining purposes are unfavorable because of the corrosive effect of the vapors on the melting unit. Therefore, preferably, the contents thereof in the glass ceramic are below 0.05 wt %, as a result of impurities in the mixture, for example. Most preferred are contents of fluorine or bromine compounds of less than 0.01 wt %.

As to the titanium oxide content it is accordingly favorable if it is not greater than 5 percent by weight, such as in the above composition. A content from 2.5 to 5 percent by weight is preferred. Most preferably, the content is not more than 3.9 percent by weight. At the same time this content ensures that a sufficient nucleation for ceramization occurs, because titanium oxide functions as a nucleating agent.

The elements iron and cerium have in common that they are easily transformed between different oxidation states. It is assumed that instead of a reduction of the vanadium oxide by tin oxide and titanium oxide a reduction of the Fe$^{3+}$ and/or Ce$^{4+}$ takes place, or that the reduction of the vanadium oxide competes with the reduction of Fe$^{3+}$ and/or Ce$^{4+}$. Considering this, it is favorable to define a ratio for the total content of tin oxide and titanium oxide relative to the total content of iron oxide and cerium oxide. Therefore, according to one modification of the invention, the following relationship is met for the contents of tin oxide, titanium oxide, iron oxide and cerium oxide: (M(SnO$_2$)+0.1*M(TiO$_2$))/(M(Fe$_2$O$_3$)+M(CeO$_2$))<4, preferably <3. Here, M denotes the amount or proportion in percent by weight of the metal oxide in brackets.

According to a preferred embodiment of the invention it may be contemplated that the sum of the proportions by weight of iron oxide and cerium oxide in the lithium aluminosilicate glass ceramic article is greater than the proportion by weight of vanadium oxide by a factor from 5 up to a factor of 20. Beginning from a factor of 5 it is possible to achieve a useful decoloration of the glass ceramic article. By a suitable choice of the factor in a range between 5 and 20 the transmittance of the glass ceramic article can be adjusted in a wide range. Beyond a factor of 20 no further relevant increase in transmittance in the visible range can be achieved any more. Rather, a further increase of the iron oxide or cerium contents would lead to an undesirable reduction of transmittance in the infrared range.

The invention now makes it possible to adjust a constant vanadium oxide content in the mixture and to adjust the desired hue or the desired transmittance through the iron oxide content. The alteration in hue as a function of the variation of the iron oxide content is less than it is the case when varying the vanadium oxide content. Thus, a desired hue and a desired transmittance can be adjusted very precisely. Accordingly, production-related variations in hue are less pronounced.

However, chromium oxide has been found unfavorable in conjunction with vanadium oxide as a coloring agent and cerium oxide or iron oxide for decoloring purposes. Therefore, according to yet another embodiment of the invention it is contemplated that the proportion by weight of chromium or chromium oxide is less than 0.01%, preferably less than 0.005%. Chromium oxide has an additional color-imparting effect and has its own absorption bands. The selective coloring makes it difficult to adjust a smooth transmittance characteristic, and specific display colors might be selectively attenuated. Furthermore, chromium oxide is a strong nucleating agent, but technologically difficult to control. For example in the paper "Ultrafine grained glass-ceramics obtained with Cr$_2$O$_3$ additions", B. Andrianasolo et al., J. Non-Cryst. Solids 126 (1990) 103-110 it is concluded that chromium is a critical component in the production of ultrafine glass ceramics. Accordingly, although it is not incorporated into the nucleating agent crystal chromium has an influence on nucleation already in small quantities.

The glass ceramic article according to the invention is in particular produced using a method comprising the steps of: preparing a mixture for lithium aluminosilicate glass ceramics, wherein the mixture comprises at least 0.005 percent by weight of vanadium oxide, preferably at least 0.01, more preferably up to 0.05 percent by weight of vanadium oxide, and less than 0.5 percent by weight of tin oxide; predefining a transmittance value of 2.5% or more in the visible spectral range, the transmittance value being higher than the transmittance value of a glass ceramic article produced from the same vanadium oxide containing mixture but with an iron oxide content or cerium oxide content of less than 0.1 percent by weight; adding iron oxide and/or cerium oxide in an amount which neutralizes the absorption caused by the vanadium oxide in the visible spectral range to such an extent that the predefined transmittance value is obtained in the glass ceramic article; melting the mixture and producing a glass precursor, such as in particular a glass plate; and ceramizing the glass precursor, so that a glass ceramic article is obtained.

Generally, not only limited to this embodiment of the invention, the glass plate may be deformed before or during ceramization, so that the glass ceramic article is not necessarily plate-like or entirely flat. To mention an example again, a glass ceramic plate for a cooktop may have a molded hollow that can be used as a wok.

BRIEF DESCRIPTION OF THE DRAWINGS

The invention will now be described by way of exemplary embodiments and with reference to the accompanying drawings. In the drawings.

DETAILED DESCRIPTION

Figure 1:
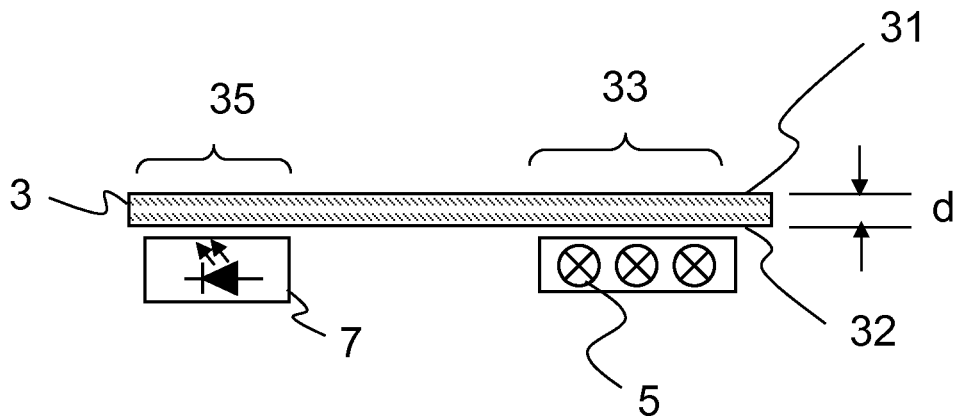
FIG. 1 shows a glass ceramic cooktop including a glass ceramic plate according to the invention.

The invention is particularly suitable for glass ceramic cooktops. In this case the glass ceramic according to the invention exhibits a transmittance such that a very good visibility and color reproduction for self-luminous display elements is achieved. FIG. 1 shows a schematic side view of an exemplary embodiment of a glass ceramic cooktop 1 that comprises a glass ceramic article according to the invention in form of a glass ceramic plate 3. Glass ceramic plate 3 has an upper surface 31 and a lower surface 32. Heating elements 5 are arranged below lower surface 32 for heating cookware positioned oppositely on the upper surface 31 in a cooking zone 33, or optionally for directly heating food to be boiled or cooked. Glass ceramic plate 3 has a thickness d, typically in a range from 2 to 6 millimeters.

Generally, without being limited to the illustrated example, at least one self-luminous display element 7 may additionally be arranged below the glass ceramic article or glass ceramic plate 3, which shines through the glass ceramic plate 3. By virtue of the improved transmittance of the glass ceramic plate 3 according to the invention, the latter now transmits in particular not only red light in a considerable intensity. Rather, it is possible to display yellow, green, and blue spectral ranges. Accordingly, in one embodiment of the invention the self-luminous display element 7 is adapted to emit light in the visible spectral range with wavelengths of less than 570 nanometers, preferably less than 510 nanometers. A suitable display element is a light emitting diode display, for example. In accordance with the transmittance in the yellow, green, and blue spectral ranges it is then possible to use display elements emitting in the yellow, green, or blue spectral ranges, for example correspondingly yellow, green, or blue light LEDs, as well as white light LEDs. It is also possible, that the display element consist of a color display that allows for a variety of indications and information for the user.

Display element 7 may, for example, be arranged below a display and/or control area 35 of the glass ceramic plate 3, as illustrated. An arrangement in cooking zone 33 is also conceivable, for example for visually signalling which one of the cooking zones is currently enabled and heating. According to yet another embodiment, other than illustrated, the cooking zone may be curved to form a cooking vessel such as a wok. Also, the edges of the glass ceramic may be curved.

Due to the properties of the glass ceramic which will be described in more detail below, even yellow, green, or blue spectral components of the light emitted by the display element 7 will be visible to an observer through the glass ceramic plate 3.

Figure 2:
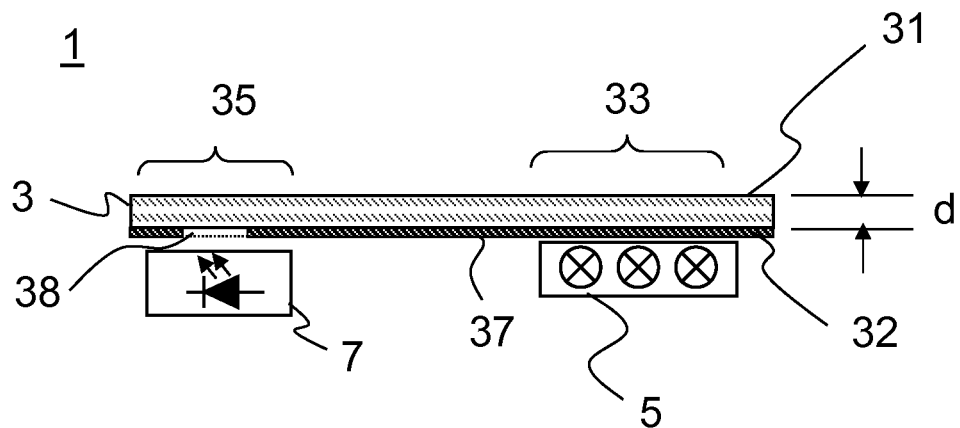
FIG. 2 shows a variation of the glass ceramic cooktop illustrated in FIG. 1.

FIG. 2 shows a variation of the embodiment illustrated in FIG. 1. Due to the comparatively high transmittance of the glass ceramic according to the invention, it may optionally be desirable in turn to reduce transmission in the visible spectral range. For this purpose, according to one embodiment of the invention exemplified in FIG. 2, an at least partially light-blocking coating 37 is provided on the lower surface 32 of glass ceramic plate 3.

Light-blocking coating 37 is preferably heat resistant. This will be useful at least if the light-blocking coating 37 extends along cooking zone 33, as illustrated in FIG. 2.

Both light absorbing and light reflecting coatings are contemplated as a light-blocking coating 37. The light-blocking coating 37 serves to ensure that the components of the cooktop arranged below ceramic glass plate 3 remain invisible for an observer. In order to change the design and aesthetics, the light-blocking coating 37 may be varied in color or may be patterned. Layers of organic or inorganic paints, such as lacquer or enamel layers are considered for the light-blocking coating 37. Also, metallic or optical interference reflective coatings may be used. Moreover, reflecting or absorbing coatings may be formed from metal compounds such as oxides, carbides, nitrides, or from mixed compounds of oxides, carbides, nitrides. Optionally, it is also possible to use a semiconductor coating such as a silicon layer as the light-blocking coating 37.

In order not to affect the display capability, according to yet another embodiment of the invention it is contemplated that the light-blocking coating has at least one recess 38, with the self-luminous display element 7 arranged below glass ceramic plate 3 shining through the recess 38.

Figure 3:
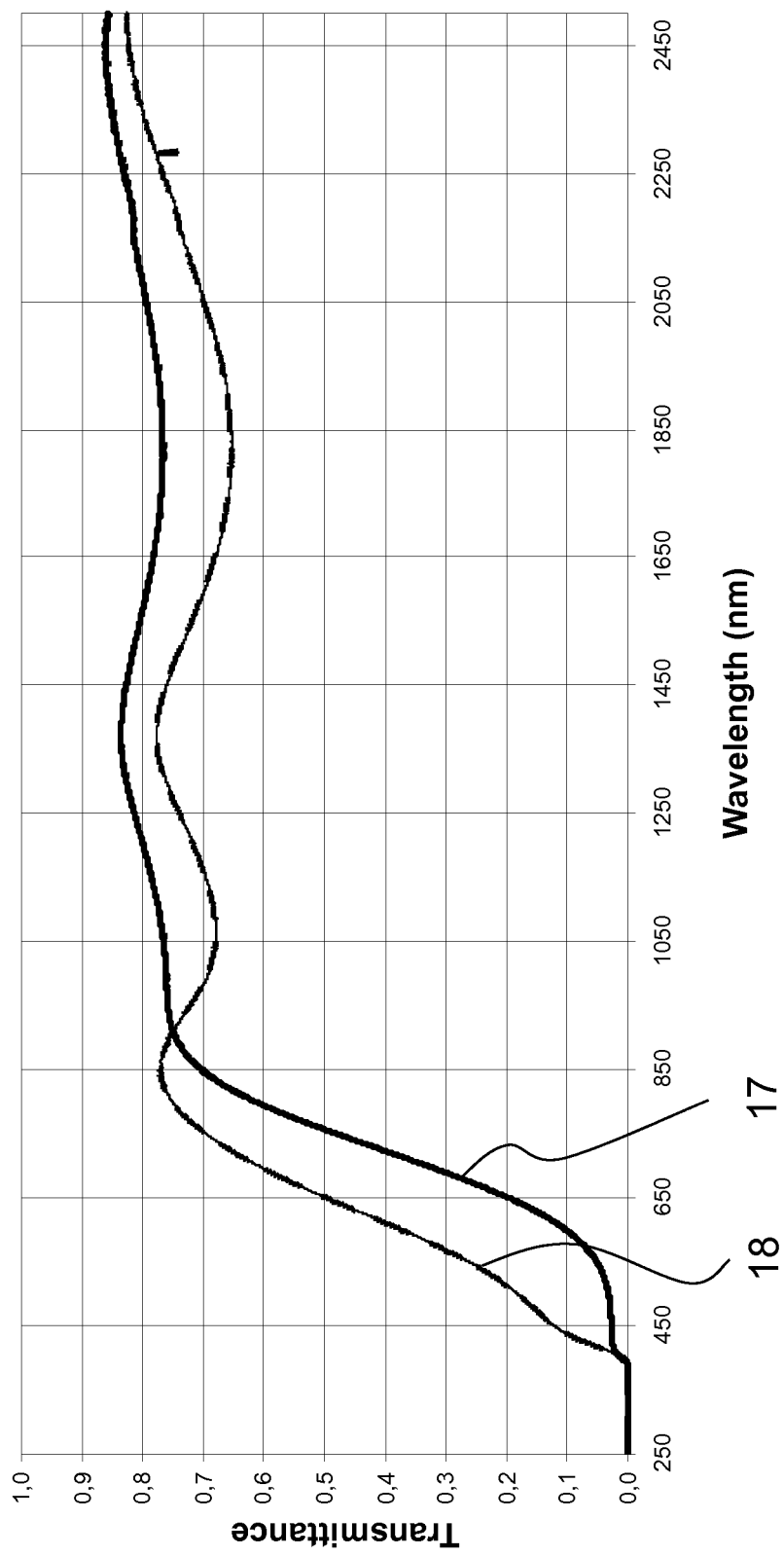
FIG. 3 shows the spectral transmittance of two glass ceramics as a function of wavelength.

For comparison, FIG. 3 shows spectral transmittance characteristics 17, 18 of two glass ceramics. The glass ceramic plates used for the measurement had a thickness of 3 mm and were irradiated perpendicularly to the surface.

The transmittance characteristic designated by reference numeral 17 was measured on a glass ceramic having a low iron oxide content. By contrast, transmittance characteristic 18 was measured on a glass ceramic according to the invention which has a $Fe_2O_3$ content of more than 0.1 percent by weight which, moreover, is higher than the vanadium content. Here, the vanadium content is the same in both samples.

Specifically, the two glass ceramics of transmittance characteristics 17, 18 have the same composition, in percent by weight, of:

| | |
|---|---|
| $SiO_2$ | 65.14 |
| $Al_2O_3$ | 20.9 |
| $Li_2O$ | 3.71 |
| $Na_2O$ | 0.59 |
| $K_2O$ | 0.22 |

-continued

| | |
|---|---|
| MgO | 0.37 |
| ZnO | 1.5 |
| CaO | 0.42 |
| BaO | 2.3 |
| TiO$_2$ | 3.1 |
| ZrO$_2$ | 1.34 |
| SnO$_2$ | 0.24 |
| V$_2$O$_5$ | 0.026 |
| MnO$_2$ | 0.025 |

The two glass ceramics only differ in the content of iron oxide. The glass ceramic with transmittance characteristic 17 has an Fe$_2$O$_3$ content of 0.093 percent by weight. By contrast, the glass ceramic plate according to the invention with transmittance characteristic 18 has an Fe$_2$O$_3$ content of 0.2 percent by weight. So, first, the content is greater than 0.1 percent by weight, as contemplated by the invention, and, second, it is greater than the content of vanadium oxide V$_2$O$_5$ by a factor of 7.7. And, the content of titanium oxide is lower than the preferred upper limit of 3.9 percent by weight or less.

Preferably, the glass ceramics of the invention have a composition substantially comprising the following components, in wt %, on an oxide basis:

| | |
|---|---|
| Li$_2$O | 3.0-5.0 |
| Σ Na$_2$O + K$_2$O | 0.2-1.5 |
| MgO | 0-2 |
| Σ CaO + SrO + BaO | 0-4 |
| ZnO | 0-3 |
| B$_2$O$_3$ | 0-2 |
| Al$_2$O$_3$ | 18-25 |
| SiO$_2$ | 55-75 |
| TiO$_2$ | 1-5 |
| ZrO$_2$ | 0-2 |
| P$_2$O$_5$ | 0-3 |
| SnO$_2$ | 0.15-0.5 |
| Σ TiO$_2$ + ZrO$_2$ + SnO$_2$ | 3.8-6 |
| V$_2$O$_5$ | 0.005-0.05 |
| Fe$_2$O$_3$ + CeO$_2$ | 0.1-0.6 |

Here, as in the other embodiments of the invention, either Fe$_2$O$_3$ or CeO$_2$ or both components are present.

Furthermore, the condition mentioned above is met: (M(SnO$_2$)+0.1*M(TiO$_2$))/(M(Fe$_2$O$_3$)+M(CeO$_2$))<3. In this glass ceramic, the ratio of the weight fractions of these components has a value of 2.75.

As can be seen from the graph of FIG. 3, the iron oxide reduces the absorption caused by the vanadium oxide in the visible spectral range, in particular between 750 and 450 nanometers, so that even with a high vanadium oxide content of more than 0.02 percent by weight, even with more than 0.025 percent by weight, a transmittance of more than 2.5%, even more than 5% is achieved in the visible spectral range between 450 and 750 nanometers. Specifically, the transmittance measured on a sample of 3 mm thickness with standard illuminant C in the visible range and corresponding to the color value Y was 28.5%. Furthermore, with standard illuminant A, a light transmittance of 31.5% was measured in the visible spectral range. Measurements of the visible transmission with standard illuminant D65 revealed a light transmittance of Y=28.4%.

FIG. 3 illustrates another specific effect in conjunction with the decoloration of vanadium oxide due to a certain content of Fe$_2$O$_3$.

Obviously, the effect of decoloration on absorption is stronger in the short wavelengths visible spectral range than in the longer wavelengths visible spectral range. A result thereof is that the transmittance characteristic becomes considerably more linear than that of the comparison sample with a lower content of Fe$_2$O$_3$.

When fitting a straight line in the range of wavelengths from 450 to 700 nanometers using the method of least squares, the coefficient of determination R$^2$ of transmittance characteristic 18 of the glass ceramic according to the invention has a value of 0.9857. By comparison, transmittance characteristic 17 of the comparison sample has a significantly lower value of 0.861. The coefficient of determination R$^2$ is given by:

$$R^2 = 1 - \frac{\sum_{i=1}^{n}(Y_i - \hat{Y}_i)^2}{\sum_{i=1}^{n}(Y_i - \overline{Y})^2}. \tag{1}$$

In this relationship, the Y$_i$ values denote the measured values of transmittance at different wavelengths, $\hat{Y}_i$ the corresponding values of the straight line fitted to the measured values at the respective wavelength corresponding to Y$_i$, and $\overline{Y}$ the average of the Y$_i$ values. The index i numbers the individual measured values of transmittance Y$_i$ up to the largest value n.

The coefficient of determination takes a value between zero (no linear correlation) and one (perfect linear correlation of the measured values), depending on the linear correlation of the measured values. Therefore, the coefficient of determination of 0.9857 demonstrates that the transmittance characteristic is highly linear.

This effect in particular also occurs in the yellow to blue spectral ranges. For an interval of wavelengths from 450 to 600 nanometers, a similarly high coefficient of determination R$^2$ of 0.9829 is obtained for the glass ceramic according to the invention, while the coefficient of determination for the comparison sample is only 0.8589. Generally, as has been shown by way of this example, iron oxide may be metered to the mixture or the contents of Fe$_2$O$_3$ and V$_2$O$_5$ may be adjusted to such a ratio that with a given vanadium oxide content the spectral transmittance characteristic in a range of wavelengths between 450 and 600 nanometers becomes linear to such an extent that for a straight line fitted to the transmittance characteristic of the glass ceramic using the method of least squares a resulting coefficient of determination R$^2$ is greater than 0.9, preferably greater than 0.95.

This feature is particularly advantageous when using colored displays. If one or more self-luminous display elements emit light of different wavelengths, the approximately linear transmittance characteristic allows for an easier adjustment of the display elements in view of a true color reproduction.

Figure 4:
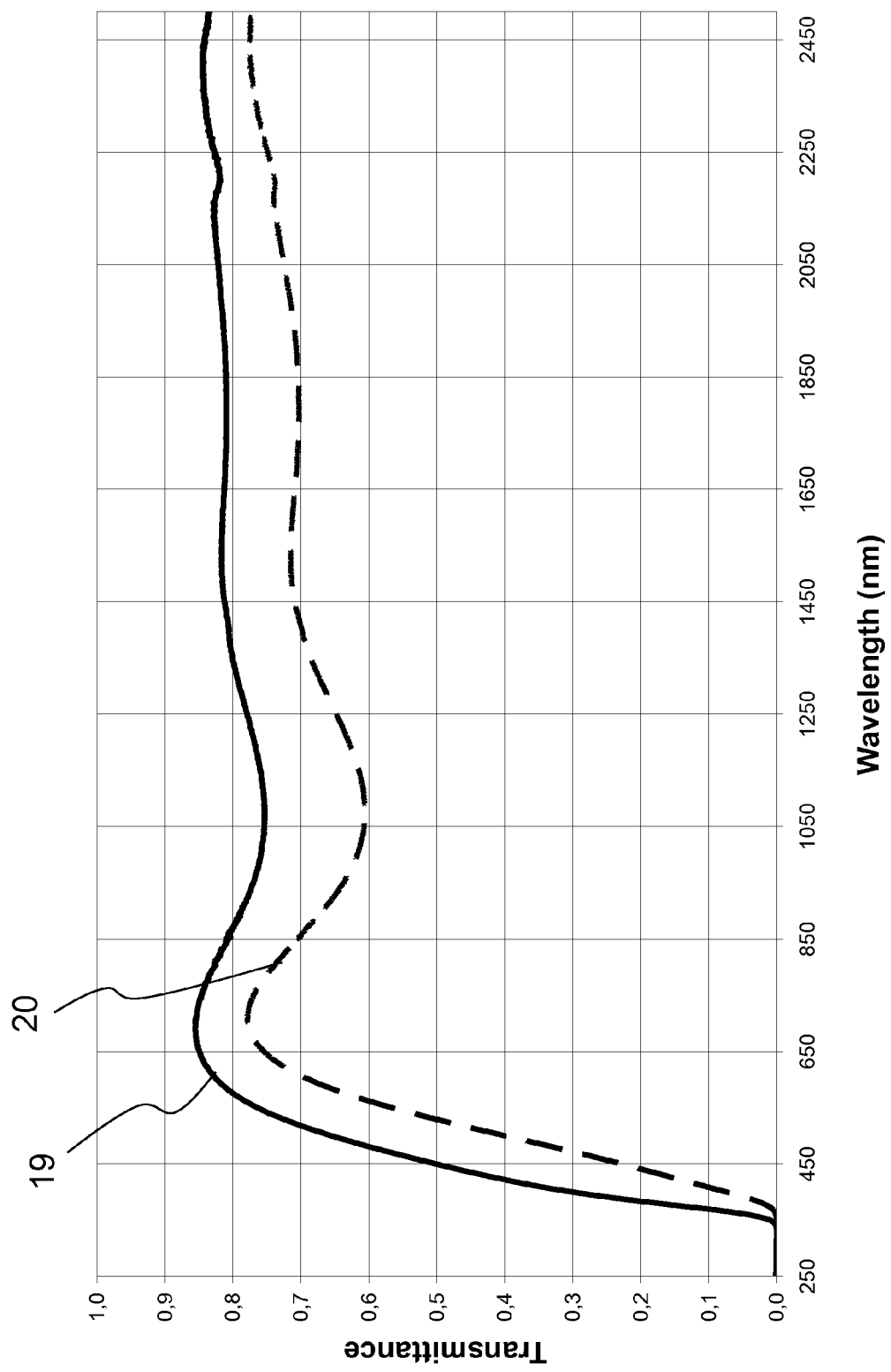
FIG. 4 shows the spectral transmittance of the starting glasses of the two glass ceramics.

Both the coloring caused by the vanadium oxide and the decoloration caused by the iron oxide substantially occur only during ceramization of the starting glass. For comparison to FIG. 3, FIG. 4 shows two transmittance characteristics of the starting glasses of the two samples. In contrast to the data of FIG. 3, the measurements of FIG. 4 were carried out on samples of 4 mm thickness. Transmittance characteristic 19 was measured on the starting glass of the comparison sample, transmittance characteristic 20 on the starting glass of the glass ceramic according to the invention. Due to the higher content of Fe$_2$O$_3$ in the glass ceramic according to the invention, spectral transmittance is consistently lower here. Although the transmittance in the infrared range is also lower in the ceramized sample due to the iron oxide, as can be seen from FIG. 3, transmittance in the visible range is higher.

Transmittance in the visible spectral range, or the Y value, further depends on the thickness of the glass ceramic plate. In the example of FIG. 3, the thickness was 3 mm, as mentioned above. When a thicker plate is used, for example one of 4 mm thickness, transmittance decreases for the same composition of the starting glass. Therefore, the vanadium oxide content may advantageously be adjusted as a function of the thickness of the plate. Specifically, according to a further embodiment of the invention it is contemplated that the vanadium oxide content is at least 0.066/x percent by weight, wherein x is the thickness of the glass ceramic in millimeters.

Similarly it is possible to adjust the iron oxide content and/or the cerium oxide content as a function of the thickness of the plate in order to obtain specific transmittance values regardless of the thickness of the plate. According to yet another embodiment of the invention it is therefore intended that the iron oxide content or cerium oxide content is at least 0.4/x percent by weight, wherein x is the thickness of the glass ceramic in millimeters.

Figure 5:
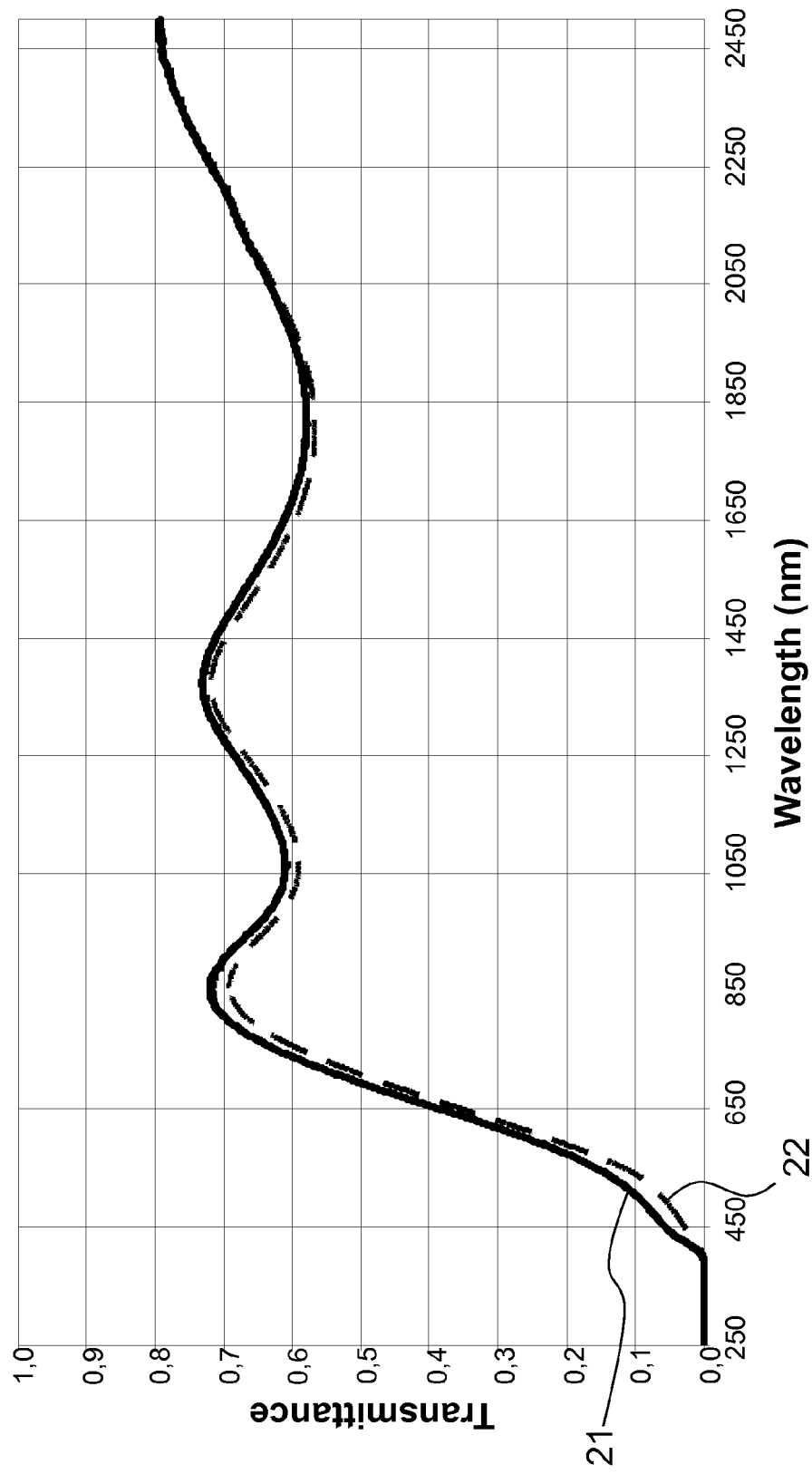
FIG. 5 shows the spectral transmittance of a glass ceramic according to the invention before and after a heat stress test.

The glass ceramic plates of the invention prove to be equally resistant under the extreme operating conditions of a glass ceramic cooktop when compared to conventional glass ceramics, both in terms of coloration and absorption. To illustrate this, FIG. 5 shows two transmittance characteristics 21, 22, both of which were measured on the glass ceramic of the invention on which the examples of FIGS. 3 and 4 were based. Accordingly, the glass ceramic has a $Fe_2O_3$ content of 0.2 percent by weight. From this glass ceramic, a sample of approximately 4 mm thickness was prepared, and transmittance characteristic 21 was measured on this sample.

Then, a subsequent heat treatment was performed at 800° C. for a period of 10 hours, and then transmittance characteristic 22 was measured. According to that, transmittance in the visible spectral range after heat treatment is still 78% of the initial value with light transmission Y. Although transmittance decreases, the percentage reduction of transmittance is within the range of what is found for other volume-colored LAS glass ceramics. In absolute terms, transmittance in the visible spectral range in particular remains significantly higher than that of the comparison sample having a lower $Fe_2O_3$ content of less than 0.1 percent by weight.

The effect of iron oxide and tin oxide on the transmittance of the glass ceramic is moreover well demonstrated by the exemplary embodiments listed in the table below:

The samples have a thickness of 4 mm. The basic composition of samples 1 to 8 substantially corresponds to the composition specified in the description of FIG. 3, with 65.14 percent by weight of $SiO_2$ and 20.9 percent by weight of $Al_2O_3$. The vanadium oxide content of 220 ppm (0.02 wt %) is somewhat lower than in the examples of FIG. 3 (260 ppm), the $SnO_2$ content of 2500 ppm instead of 2400 ppm is slightly higher. As can be seen from the table, with the sample number increasing the iron oxide content was gradually increased from 100 ppm to 3000 ppm.

In samples 1 to 3, the iron oxide content is still less than 1000 ppm, in sample 4 a $Fe_2O_3$ content of more than 1000 ppm is reached, with 1250 ppm. While in the comparison examples of samples 1 to 3 the transmittance (indicated as Y color value) is still less than 2.5%, this value is exceeded in sample 4. The transmittance clearly increases further as the $Fe_2O_3$ content increases, as can be seen from the transmittance values of samples 4 to 8, and with an $Fe_2O_3$ content of 3000 ppm and the given plate thickness of 4 millimeters, a transmittance of 4.17% is obtained in the visible spectral range.

The preferred additional condition $(M(SnO_2)+0.1*M(TiO_2))/(M(Fe_2O_3)+M(CeO_2))<4$, that the ratio of the components in percent by weight (designated (Sn+0.1Ti)/Fe in the table) is less than 4, is achieved in all samples 5 to 8 of the invention. In samples 6 to 8, this ratio is less than three.

And, in all samples 4 to 8 of the invention, the ratio of weight fractions $Fe_2O_3/V_2O_5$ (abbreviated Fe/V in the table) is between 5 and 20 as preferably contemplated according to the invention, while in samples 1 to 3 this ratio has a value of less than 5.

From these examples it is apparent that for a glass ceramic article of a given vanadium oxide containing composition a predetermined transmittance can be adjusted in a simple manner by adding a metered amount of iron oxide. The transmittance value of course also depends on the thickness of the glass ceramic article. If the thickness of the glass ceramic article is lower than the 4 mm thickness of the example, a smaller amount of iron oxide will be sufficient for a specific transmittance value. Therefore, in order to produce a glass ceramic article such as a glass ceramic cooktop with a predefined transmittance, first a transmittance value of 2.5% or more in the visible spectral range is predefined, wherein this transmittance value is higher than the transmittance value of a glass ceramic made from the same vanadium oxide containing mixture but with an iron oxide content of less than 0.1 percent by weight. Then, iron oxide

| | Sample | | | | | | | |
|---|---|---|---|---|---|---|---|---|
| Component | 1 [ppm] | 2 [ppm] | 3 [ppm] | 4 [ppm] | 5 [ppm] | 6 [ppm] | 7 [ppm] | 8 [ppm] |
| CoO | 0 | 0 | 0 | 0 | 0 | 0 | 0 | 0 |
| NiO | 0 | 0 | 0 | 0 | 0 | 0 | 0 | 0 |
| $Cr_2O_3$ | 0 | 0 | 0 | 0 | 0 | 0 | 0 | 0 |
| $Nd_2O_3$ | 0 | 0 | 0 | 0 | 0 | 0 | 0 | 0 |
| $Er_2O_3$ | 0 | 0 | 0 | 0 | 0 | 0 | 0 | 0 |
| $MnO_2$ | 1 | 1 | 1 | 1 | 1 | 1 | 1 | 1 |
| $Fe_2O_3$ | 100 | 500 | 750 | 1250 | 1500 | 2000 | 2500 | 3000 |
| $TiO_2$ | 31000 | 31000 | 31000 | 31000 | 31000 | 31000 | 31000 | 31000 |
| $SnO_2$ | 2500 | 2500 | 2500 | 2500 | 2500 | 2500 | 2500 | 2500 |
| $V_2O_5$ | 220 | 220 | 220 | 220 | 220 | 220 | 220 | 220 |
| $ZrO_2$ | 13248 | 13248 | 13248 | 13248 | 13248 | 13248 | 13248 | 13248 |
| (Sn + 0.1Ti)/Fe | 56.00 | 11.20 | 7.47 | 4.48 | 3.73 | 2.80 | 2.24 | 1.87 |
| Fe/V (5-30) | 0.45 | 2.27 | 3.41 | 5.68 | 6.82 | 9.09 | 11.36 | 13.64 |
| Y (4 mm) | 1.89 | 2.1 | 2.25 | 2.58 | 2.77 | 3.17 | 3.64 | 4.17 | is added to the melt or mixture to be melted in an amount which neutralizes the absorption caused by the vanadium oxide in the visible spectral range to such an extent that the predefined transmittance value is obtained in the glass ceramic with the intended thickness of the glass ceramic article. The method may likewise be performed using $CeO_2$ instead of or in addition to $Fe_2O_2$.

$CeO_2$, likewise, is very effective as a decoloring agent for $V_2O_5$ containing glass ceramics, as will be shown by the following exemplary embodiment. Two lithium aluminosilicate glass ceramic samples of similar composition were prepared, the comparison sample with a $V_2O_5$ content of 0.2 percent by weight, and the sample according to the invention with a $V_2O_5$ content of 0.4 percent by weight, i.e. twice as high. If, additionally, 0.5 percent by weight of $CeO_2$ is added to the latter mixture, transmittance remains almost the same, although, as mentioned before, $V_2O_5$ is a very strong color-imparting agent strongly absorbing in the visible spectral range. In other words, the addition of $CeO_2$ compensates for a doubling of the $V_2O_5$ content in terms of transmittance in the visible spectral range.

The mixtures of the sample according to the invention and the comparison sample have the following compositions:

| Component: | Comparison Sample: | Sample of the invention: |
| --- | --- | --- |
| $Al_2O_3$ | 22.47 | 22.21 |
| $K_2O$ | 0.20 | 0.20 |
| $Li_2O$ | 4.08 | 4.00 |
| MgO | 1.00 | 0.98 |
| $Na_2O$ | 0.64 | 0.64 |
| $P_2O_5$ | 1.33 | 1.32 |
| $SiO_2$ | 65.84 | 65.35 |
| $SnO_2$ | 0.44 | 0.40 |
| $TiO_2$ | 1.80 | 1.80 |
| $V_2O_5$ | 0.20 | 0.41 |
| ZnO | 0.20 | 0.20 |
| $ZrO_2$ | 2.00 | 2.00 |
| ZnO | 0.00 | 0.20 |
| $CeO_2$ | 0.00 | 0.50 |

In a preferred embodiment, the $CeO_2$ content should be at most 0.6 wt %. Higher contents are inefficient in view of the decreasing effect. Light transmittance of the ceramized samples in the visible spectral range is 1.2% in a comparison sample of 4 mm thickness, and is still 1.1% in the sample decolored with $CeO_2$. At a wavelength of 600 nanometers, the comparison sample has a transmittance of 2.49%. The transmittance of the sample decolored using $CeO_2$ is virtually the same, with 2.44%.

What is claimed is:

1. A lithium aluminosilicate glass ceramic article comprising:
   titanium oxide;
   vanadium oxide as a color-imparting component in a proportion of at least 0.005;
   tin oxide in a proportion of 0.15 to 0.5 percent by weight; and
   a decoloring agent consisting of iron oxide in a proportion of more than 0.1 percent by weight,
   wherein the proportion by weight of the iron oxide is greater than the proportion by weight of vanadium oxide by a factor from 5 up to a factor of 20,
   wherein the article has a light transmittance in the visible spectral range when illuminated perpendicularly to a surface of the article that is greater than 2.5%,
   wherein the proportions of the tin oxide, the titanium oxide, and the iron oxide meet a relationship of $(M(SnO_2)+0.1*M(TiO_2))/(M(Fe_2O_3))<4$, and
   wherein M is the respective proportion in percent by weight of the component in the following brackets.

2. A lithium aluminosilicate glass ceramic article comprising:
   titanium oxide;
   vanadium oxide as a color-imparting component in a proportion of at least 0.005;
   tin oxide in a proportion of from 0.15 to 0.5 percent by weight; and
   a decoloring agent comprising iron oxide in a proportion of more than 0.1 percent by weight and/or cerium oxide in a proportion of at least 0.1 percent by weight,
   wherein the decoloring agent has a proportion by weight of a sum of the iron oxide and the cerium oxide that is greater than the proportion by weight of vanadium oxide by a factor from 7.7 up to a factor of 20,
   wherein the article has a light transmittance in the visible spectral range when illuminated perpendicularly to a surface of the article that is greater than 2.5%,
   wherein the proportions of the tin oxide, the titanium oxide, and the iron oxide and/or the cerium oxide meet a relationship of $(M(SnO_2)+0.1*M(TiO_2))/(M(Fe_2O_3)+M(CeO_2))<4$,
   wherein M is the respective proportion in percent by weight of the component in the following brackets, and
   wherein the sum of the iron oxide and the cerium oxide is at most 0.6 percent by weight.

3. The lithium aluminosilicate glass ceramic article as claimed in claim 2, wherein the proportion of the vanadium oxide is at least 0.05 percent by weight.

4. The lithium aluminosilicate glass ceramic article as claimed in claim 2, wherein the proportion of vanadium content is at least 0.066/x percent by weight, wherein x is a thickness of the article in millimeters.

5. The lithium aluminosilicate glass ceramic article as claimed in claim 4, wherein the thickness is in a range from 2.5 to 7 millimeters.

6. The lithium aluminosilicate glass ceramic article as claimed in claim 2, wherein the proportion of the tin oxide is in a range from 0.2 to 0.45 percent by weight.

7. The lithium aluminosilicate glass ceramic article as claimed in claim 2, wherein the titanium oxide is in a proportion of less than 5 percent by weight.

8. The lithium aluminosilicate glass ceramic article as claimed in claim 2, wherein the titanium oxide is in a proportion of from 2.5 to 5 percent by weight.

9. The lithium aluminosilicate glass ceramic article as claimed in claim 2, wherein the relationship is $(M(SnO_2)+0.1*M(TiO_2))/(M(Fe_2O_3)+M(CeO_2))<3$.

10. The lithium aluminosilicate glass ceramic article as claimed in claim 2, wherein the sum of the iron oxide and/or the cerium oxide includes iron oxide, and further comprising a ratio of $Fe_2O_3$ and $V_2O_5$ is such that in a range of wavelengths between 450 and 600 nanometers a coefficient of determination $R^2$ resulting for a straight line fitted to a transmittance characteristic of the article using the method of least squares is more than 0.9.

11. The lithium aluminosilicate glass ceramic article as claimed in claim 10, wherein the coefficient of determination $R^2$ is more than 0.95.

12. The lithium aluminosilicate glass ceramic article as claimed in claim 2, further comprising a proportion by weight of chromium or chromium oxide of less than 0.01%.

13. The lithium aluminosilicate glass ceramic article as claimed in claim 2, wherein the article is a glass ceramic cooktop and further comprising a self-luminous display element positioned below the glass ceramic cooktop and positioned to shine through the glass ceramic cooktop, wherein the self-luminous display element emits light in the visible spectral range with wavelengths of less than 570 nanometers.

14. The lithium aluminosilicate glass ceramic article as claimed in claim 13, further comprising an at least partially light-blocking coating on a lower surface of the glass ceramic cooktop.

15. The lithium aluminosilicate glass ceramic article as claimed in claim 14, wherein the light-blocking coating has a recess, wherein the self-luminous display element is positioned to shine through the recess.

* * * * *